United States Patent [19]

Tanaka et al.

[11] Patent Number: 5,777,427
[45] Date of Patent: Jul. 7, 1998

[54] ELECTRON EMISSION CATHODE HAVING A SEMICONDUCTOR FILM; A DEVICE INCLUDING THE CATHODE; AND A METHOD FOR MAKING THE CATHODE

[75] Inventors: Hiroyoshi Tanaka, Kyoto; Koichi Kotera, Osaka; Masao Uchida, Ibaraki, all of Japan

[73] Assignee: Matsushita Electric Industrial Co., Ltd., Osaka, Japan

[21] Appl. No.: 539,699

[22] Filed: Oct. 5, 1995

[30] Foreign Application Priority Data

| Oct. 5, 1994 | [JP] | Japan | 6-241221 |
| Mar. 15, 1995 | [JP] | Japan | 7-056016 |
| Mar. 20, 1995 | [JP] | Japan | 7-060755 |

[51] Int. Cl.$^6$ .................................................. H01J 1/02
[52] U.S. Cl. .................... 313/309; 313/336; 313/351; 313/495
[58] Field of Search .................................. 313/309, 308, 313/336, 310, 351, 491, 495, 496, 497; 315/169.4

[56] References Cited

U.S. PATENT DOCUMENTS

| 3,808,477 | 4/1974 | Swank . |
| 4,276,440 | 6/1981 | Cannelli . |
| 4,382,833 | 5/1983 | Coyle et al. . |
| 4,513,308 | 4/1985 | Greene et al. . |
| 4,766,340 | 8/1988 | Van Der Mast et al. . |
| 5,341,063 | 8/1994 | Kumar ........................ 313/309 |
| 5,410,166 | 4/1995 | Kennel . |
| 5,578,901 | 11/1996 | Fincher et al. ............. 313/309 |
| 5,623,180 | 4/1997 | Jin et al. ..................... 313/309 |

FOREIGN PATENT DOCUMENTS

| 0555074 | 8/1993 | European Pat. Off. . |
| 0572777 | 12/1993 | European Pat. Off. . |
| 4-3475 | 1/1992 | Japan . |
| 6-13664 | 1/1994 | Japan . |
| 2260641 | 4/1993 | United Kingdom . |
| 91/05361 | 4/1991 | WIPO . |
| WO 91/17601 | 11/1991 | WIPO . |

OTHER PUBLICATIONS

E. Kohn, "The Silicon Cold Cathode", *IEEE Transactions on Electron Devices*, vol. 20, No. 3, pp. 321–329 (Mar. 1973).

G.D. Mahan, "Thermionic Refrigeration", *Journal of Applied Physics*, vol. 76, No. 7, pp. 4362–4366, (Oct. 1994).

*Primary Examiner*—Sandra L. O'Shea
*Assistant Examiner*—Vip Patel
*Attorney, Agent, or Firm*—Ratner & Prestia

[57] ABSTRACT

An electron emission cathode includes: an n-type semiconductor film including diamond particles partially projecting from a surface of the n-type semiconductor film; and an anode opposing the n-type semiconductor film with a vacuum interposed therebetween. Electrons are emitted by applying a voltage between the anode and the n-type semiconductor film.

39 Claims, 11 Drawing Sheets

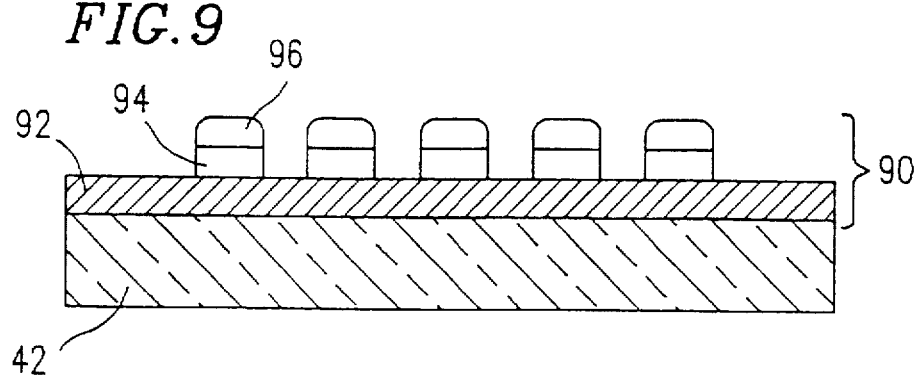
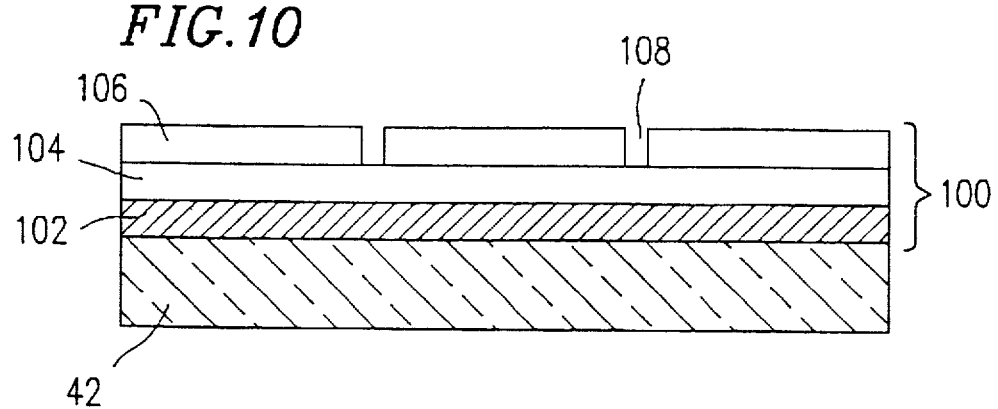
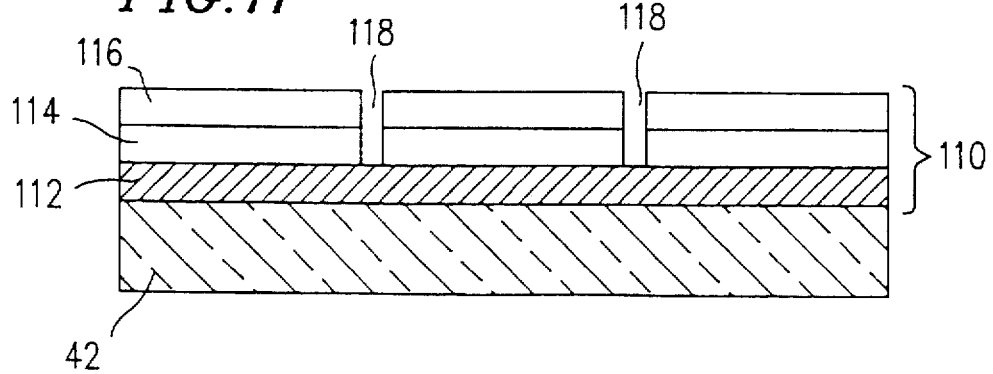

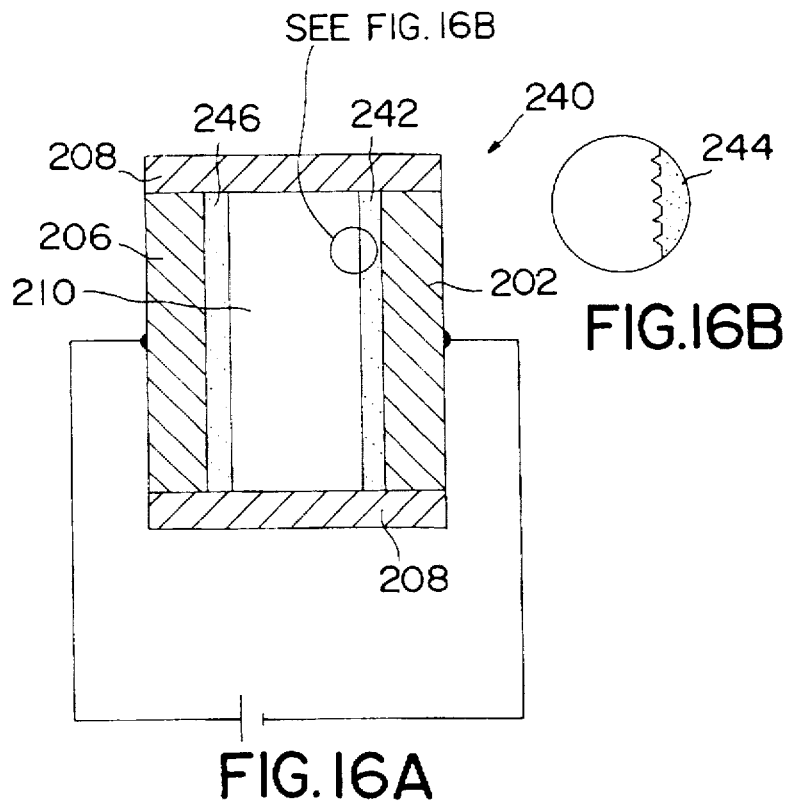
FIG.16A
FIG.16B
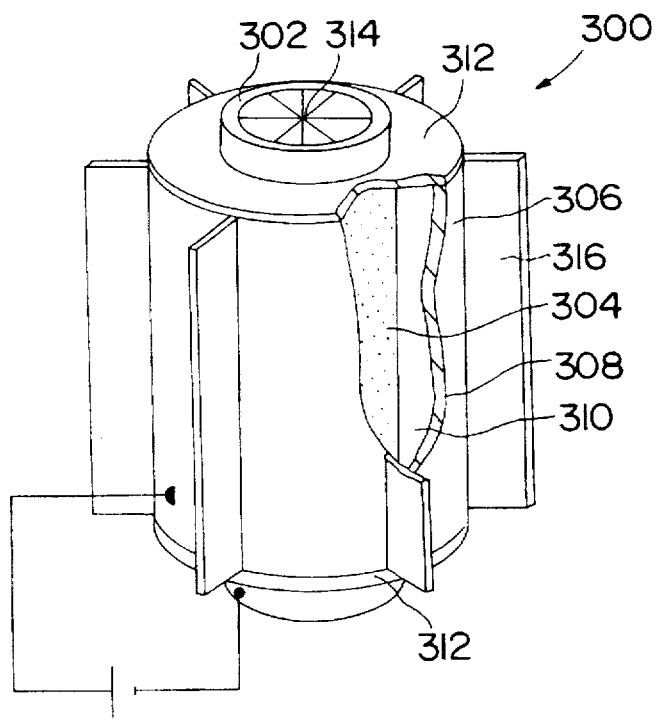
FIG.17

ID_5,777,427

ELECTRON EMISSION CATHODE HAVING A SEMICONDUCTOR FILM; A DEVICE INCLUDING THE CATHODE; AND A METHOD FOR MAKING THE CATHODE

BACKGROUND OF THE INVENTION

1. Field of the Invention

The present invention relates to an electron emission cathode; an electron emission device, a flat display, and a thermoelectric cooling device incorporating the electron emission cathode; and a method for producing the electron emission cathode.

2. Description of the Related Art

In recent years, research directed to realizing high-performance devices, such as ultra-high speed devices, by integrating minute electron emission devices using semiconductor miniaturization techniques has been vigorously conducted. This field of research is referred to as "vacuum microelectronics". Vacuum microelectronics has been attracting particular attention to its applications for flat displays (or field emission displays; hereinafter referred to as "FEDs") because the use of electron emission devices for a FED is considered to lead to a thinner and lighter display device than conventional cathode ray tube displays.

In a FED incorporating electron emission devices, the electron emission devices are disposed in a two-dimensional arrangement so as to oppose an anode on which a fluorescent substance is applied. By applying a voltage between each cathode and the anode, electrons are drawn out into a vacuum, where the electrons collide with the fluorescent substance so as to be excited and emit light.

Hereinafter, a conventional electron emission device will be described. In general, a current density J, when drawing out electrons from a solid electrode in a vacuum, is derived in accordance with Fowler-Nordheim's formula (Eq. 1):

$$J = (A \cdot F^2/\Phi) \cdot \exp(-B \cdot \Phi^{3/2}/F) \qquad \text{eq. 1}$$

In the above equation, A and B represent positive constants; F represents an electric field; and $\Phi$ represents a work function of the cathode. Assuming that a voltage V is applied when drawing out electrons, the electric field F is derived in accordance with eq. 2:

$$F = \beta V \qquad \text{eq.2}$$

In the above equation, $\beta$ is a constant which is determined by the geometrical shape of the cathode.

In accordance with eq. 1 and eq. 2, the current density J can be increased, while keeping the applied voltage V constant, by increasing $\beta$ and/or decreasing $\Phi$. However, in the case where a semiconductor is used for the cathode, the current density J can be increased by decreasing an electron affinity $\chi$ (which is the difference in energy between a vacuum level and the conduction band of the semiconductor) instead of the work function $\Phi$. In order to increase $\beta$, it is necessary to process the cathode so as to have a sharp point. Specifically, a method is often taken which etches an n-type silicon substrate so as to form an electron emission portion having a sharp-pointed projection, for example.

FIG. 18 is a schematic cross-sectional view showing a conventional electron emission device having a sharp-pointed projection as an electron emission portion. As shown in FIG. 18, the electron emission device 500 includes a silicon substrate 504 having an electron emission portion 502 and a gate electrode 508 formed on the silicon substrate 504, with an insulating film 506 interposed therebetween, so as to surround the electron emission portion 502. The electron emission portion 502, which has a pointed conical shape, is obtained by etching the silicon substrate 504. An electrode 510 is provided on the silicon substrate 504.

By placing the electron emission device 500 in a vacuum so as to oppose an anode and applying a positive voltage of several dozen volts to several hundred volts to the gate electrode 508 with respect to a potential of the silicon substrate 504, an electric field concentrates at the electron emission portion 502 because of its pointed tip. Then, a potential barrier formed by a vacuum level is lowered for the electrons in the electron emission portion 502, and the potential barrier becomes thinner, so that electrons are drawn out into the vacuum from the surface of the electron emission portion 502 owing to a tunnel effect. The electrons thus drawn out are captured by the anode opposing the silicon substrate 504, a positive voltage of several hundred to several kilo volts being applied to the anode with respect to a potential of the gate electrode 508.

In the case of an electron emission cathode composed only the silicon substrate 504 and the electron emission portion 502, without any gate electrodes included, electrons are directly drawn out and captured by an opposing anode when a voltage of several hundred to several kilo volts is applied between the anode and the silicon substrate 504.

As a conventional thermoelectric device for converting electric energy into thermal energy, a thermoelectric cooling device 520 shown in FIG. 19 is known. The thermoelectric cooling device 520 has a structure in which n-type semiconductor layers 522 and p-type semiconductor layers 524 are alternately connected to one another in series via metal plates 526 and 528. By applying a voltage between terminals 530 and 532, either the metal plates 526 or the metal plates 528 are cooled, while the other metal plates 526 or 528 are heated.

However, the above-mentioned conventional electron emission device has the following problems.

First, the tip of the electron emission portion must be processed with an accuracy on the order of nanometers, thus requiring highly sophisticated semiconductor processing techniques. Therefore, it is difficult to produce FEDs incorporating such electron emission devices at a low cost. Moreover, the shape of the tip of the electron emission portion tends to vary, thereby resulting in a nonuniform display by the FED. Furthermore, the tip of the electron emission portion is likely sputtered by ion particles colliding in a vacuum, thereby resulting in degradation of the tip within a rather short time period. As a result, it is not expected that a FED having a long lifetime can be realized.

In the case where a FED is constructed by using the above-mentioned electron emission device, it is necessary to realize a vacuum on the level of about $10^{-8}$ to $10^{-10}$ Torr. Commercial production of FEDs using such a vacuum is not realistic.

Furthermore, a silicon substrate is used as the substrate, which limits the size of the display size of the FED. This leads to the problem of difficulty in realizing large-display FEDs.

In a conventional thermoelectric cooling device, metal plates to be cooled and metal plates to be heated are connected to one another via the n-type semiconductor layers 522 and the p-type semiconductor layers 524. Heat is transmitted from the plates to be cooled to the plates to be heated via these semiconductor layers 522 and 524, thus resulting in a large leakage of heat. This results in a very low cooling/heating efficiency.

SUMMARY OF THE INVENTION

The electron emission cathode of this invention includes: an n-type semiconductor film including diamond particles partially projecting from a surface of the n-type semiconductor film; and an anode opposing the n-type semiconductor film with a vacuum interposed therebetween, wherein electrons are emitted by applying a voltage between the anode and the n-type semiconductor film.

In one embodiment of the invention, the diamond particles are composed of a p-type semiconductor.

According to anther aspect of the invention, an electron emission cathode includes: a carbon film including diamond particles partially projecting from a surface of the carbon film; and an anode opposing the carbon film with a vacuum interposed therebetween, wherein electrons are emitted by applying a voltage between the anode and the carbon film.

In one embodiment of the invention, the carbon film is an n-type semiconductor or a pseudo n-type semiconductor.

In one embodiment of the invention, the carbon film includes nitrogen as an n-type impurity, and a portion of the carbon film includes particles having a diamond structure.

According to still another aspect of the invention, an electron emission cathode includes: a conductive film; a first semiconductor film of a first conductivity type formed on the conductive film; an island-like second semiconductor film of a second conductivity type formed on the first semiconductor film; and an anode opposing the conductive film with a vacuum interposed therebetween, wherein electrons are emitted by applying a voltage between the anode and the second semiconductor film.

In one embodiment of the invention, the first semiconductor film is formed in an island-like shape.

According to still another aspect of the invention, an electron emission cathode includes: a conductive film; a first semiconductor film of a first conductivity type formed on the conductive film; a second semiconductor film of a second conductivity type formed on the first semiconductor film and having a plurality of openings provided therein, the plurality of openings at least exposing a surface of the first semiconductor film; and an anode opposing the conductive film with a vacuum interposed therebetween, wherein electrons are emitted by applying a voltage between the anode and the second semiconductor film.

In one embodiment of the invention, the plurality of openings are also present in the first semiconductor film, thereby exposing a surface of the conductive film.

In one embodiment of the invention, one of the first semiconductor film and the second semiconductor film includes diamond doped with boron.

In one embodiment of the invention, one of the first semiconductor film and the second semiconductor film is composed of a thin carbon film containing nitrogen, the thin carbon film being produced by using one selected from the group consisting of pyridine, pyridazine, pyrimidine and 1,3,5-triazine.

According to still another aspect of the invention, an electron emission device includes: a cathode composed essentially of an n-type semiconductor film including diamond particles partially projecting from a surface of the n-type semiconductor film; and an anode opposing the n-type semiconductor film with a vacuum interposed therebetween, wherein electrons are emitted from the cathode by applying a voltage between the anode and the cathode.

According to still another aspect of the invention, an electron emission device includes: a cathode composed essentially of a carbon film including diamond particles partially projecting from a surface of the carbon film; and an anode opposing the carbon film with a vacuum interposed therebetween, wherein electrons are emitted from the cathode by applying a voltage between the anode and the cathode.

According to still another aspect of the invention, an electron emission device includes: a cathode including a conductive film, a first semiconductor film of a first conductivity type formed on the conductive film, and an island-like second semiconductor film of a second conductivity type formed on the first semiconductor film; and an anode opposing the first semiconductor film with a vacuum interposed therebetween, wherein electrons are emitted from the cathode by applying a voltage between the anode and the cathode.

According to still another aspect of the invention, an electron emission device includes: a cathode including a conductive film, a first semiconductor film of a first conductivity type formed on the conductive film; and a second semiconductor film of a second conductivity type formed on the first semiconductor film and having a plurality of openings provided therein, the plurality of openings at least exposing a surface of the first semiconductor film; and an anode opposing the first semiconductor film with a vacuum interposed therebetween, wherein electrons are emitted from the cathode by applying a voltage between the anode and the cathode.

In one embodiment of the invention, the electron emission device further includes a gate electrode provided between the cathode and the anode, the gate electrode having an opening for exposing at least a portion of the cathode, wherein electrons are drawn out from the cathode by a voltage applied to the gate electrode.

In one embodiment of the invention, the cathode and the gate electrode are formed in stripes extending along different directions so as to intersect each other, and the opening is provided in the opening in an intersection of the cathode and the gate electrode.

According to still another aspect of the invention, a flat display includes: a support substrate; a cathode provided on the support substrate, the cathode being composed essentially of an n-type semiconductor film including diamond particles partially projecting from a surface of the n-type semiconductor film; a transparent substrate; and a fluorescent substance provided on a surface of the transparent electrode, wherein the support substrate and the transparent substrate are disposed in such a manner that the cathode and the fluorescent substance oppose each other, and a vacuum in an interspace between the support substrate and the transparent.

According to still another aspect of the invention, a flat display includes: a support substrate; a cathode provided on the support substrate, the cathode being composed essentially of a carbon film including diamond particles partially projecting from a surface of the carbon film; a transparent substrate; and a fluorescent substance provided on a surface of the transparent electrode, wherein the support substrate and the transparent substrate are disposed in such a manner that the cathode and the fluorescent substance oppose each other, and a vacuum in an interspace between the support substrate and the transparent.

According to still another aspect of the invention, a flat display includes: a support substrate; a cathode provided on the support substrate, the cathode including a conductive film, a first semiconductor film of a first conductivity type formed on the conductive film, and an island-like second semiconductor film of a second conductivity type formed on the first semiconductor film; a transparent substrate; and a fluorescent substance provided on a surface of the transparent electrode, wherein the support substrate and the transparent substrate are disposed in such a manner that the cathode and the fluorescent substance oppose each other, and a vacuum in an interspace between the support substrate and the transparent.

According to still another aspect of the invention, a flat display includes: a support substrate; a cathode including a conductive film, a first semiconductor film of a first conductivity type formed on the conductive film; and a second semiconductor film of a second conductivity type formed on the first semiconductor film and having a plurality of openings provided therein, the plurality of openings at least exposing a surface of the first semiconductor film; a transparent substrate; and a fluorescent substance provided on a surface of the transparent electrode, wherein the support substrate and the transparent substrate are disposed in such a manner that the cathode and the fluorescent substance oppose each other, and a vacuum in an interspace between the support substrate and the transparent.

In one embodiment of the invention, the flat display further includes a gate electrode provided between the cathode and the fluorescent substance, the gate electrode having an opening for exposing at least a portion of the cathode, wherein electrons are drawn out from the cathode by a voltage applied to the gate electrode.

In one embodiment of the invention, the cathode and the gate electrode are formed in stripes extending along different directions so as to intersect each other, and the opening is provided in an intersection of the cathode and the gate electrode.

According to still another aspect of the invention, a thermoelectric cooling device includes: a first conductive substrate having a surface; a cathode formed on the surface of the first conductive substrate; and a second conductive substrate opposing the surface of the first conductive substrate with a vacuum interposed therebetween, wherein a voltage is applied between the first conductive substrate and the second conductive substrate, whereby electrons are emitted from the cathode into the second substrate via the vacuum and a current flows between the first conductive substrate and the second conductive substrate, thus obtaining a heat absorption effect to cool the first conductive substrate.

In one embodiment of the invention, the cathode is composed essentially of an n-type semiconductor film including diamond particles partially projecting from a surface of the n-type semiconductor film.

In one embodiment of the invention, the cathode is composed essentially of a carbon film including diamond particles partially projecting from a surface of the carbon film.

In one embodiment of the invention, the cathode includes a conductive film, a first semiconductor film of a first conductivity type formed on the conductive film, and a second semiconductor film of a second conductivity type formed on the first semiconductor film and having a plurality of openings provided therein, the plurality of openings at least exposing a surface of the first semiconductor film.

In one embodiment of the invention, the cathode includes a conductive film, a first semiconductor film of a first conductivity type formed on the conductive film, and a second semiconductor film or a second conductivity type formed on the first semiconductor film and having a plurality of openings provided therein, the plurality of openings at least exposing a surface of the first semiconductor film.

In one embodiment of the invention, the cathode is composed of a material having a surface with a low work function.

In one embodiment of the invention, the cathode includes a plurality of minute projections.

In one embodiment of the invention, the cathode is composed of a semiconductor.

In one embodiment of the invention, the first conductive substrate and the second conductive substrate are respective side faces of two coaxial cylinders.

In one embodiment of the invention, the first conductive substrate and the second substrate each have a fin.

In one embodiment of the invention, the first conductive substrate and the second substrate are disposed at an interval of about 100 µm or less.

According to still another aspect of the invention, a method for producing an electron emission cathode includes the steps of: preparing a paste including diamond particles and n-type semiconductor powder or carbon powder; applying the paste on a substrate; and sintering the paste applied on the substrate.

According to still another aspect of the invention, a method for producing an electron emission cathode includes the steps of: arranging diamond particles on a substrate; and forming a carbon film having a smaller thickness than grain diameters of the diamond particles and partially having a diamond structure.

According to still another aspect of the invention, a method for producing an electron emission cathode includes the steps of: forming a carbon film partially having a diamond structure; and attaching diamond particles on the carbon film.

Thus, the invention described herein makes possible the advantages of: (1) providing a low-cost and long-life electron emission cathode which has high productivity and is capable of accommodating a large display area; (2) providing an electron emission device incorporating the electron emission cathode;,(3) a flat display incorporating the electron emission cathode or the electron emission device; and (4) a highly efficient thermoelectric device incorporating the electron emission cathode or the electron emission device.

These and other advantages of the present invention will become apparent to those skilled in the art upon reading and understanding the following detailed description with reference to the accompanying figures.

BRIEF DESCRIPTION OF THE DRAWINGS

FIG. 9 is a cross-sectional view showing another electron emission cathode according to the present invention.

FIG. 10 is a cross-sectional view showing another electron emission cathode according to the present invention.

FIG. 11 is a cross-sectional view showing another electron emission cathode according to the present invention.

FIG. 16A is a schematic cross-sectional view showing still another thermoelectric cooling device according to the present invention.

FIG. 16B is an enlarged view of a portion of FIG. 16A.

FIG. 17 is a schematic cross-sectional view showing still another thermoelectric cooling device according to the present invention.

DESCRIPTION OF THE PREFERRED EMBODIMENTS

Hereinafter, the present invention will be described by way of examples with reference to the accompanying figures.

(EXAMPLE 1)

Figure 1A:
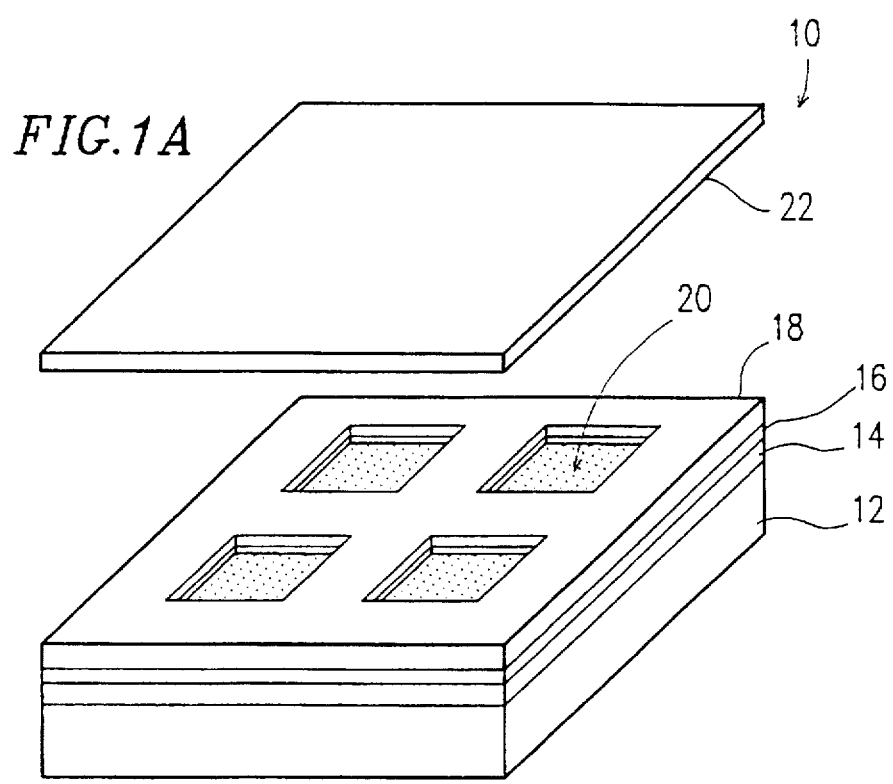
FIGS. 1A is a perspective view showing an electron emission device according to Example 1 of the present invention.

FIG. 1A is a perspective view showing an electron emission device 10 according to Example 1 of the present invention. As shown in FIG. 1A, the electron emission device 10 includes an electron emission cathode 14 provided on a substrate 12, an insulating film 16 provided on the electron emission cathode 14, and a gate electrode 18 composed of a conductive film and provided on the insulating film 16. The gate electrode 18 and the insulating film 16 both have openings 20. Each opening 20 preferably has a size of about several nanometers to several dozen micrometers in a diameter or a transverse direction. The opening 20 shown in FIG. 1A has a rectangular shape, but the opening 20 can have any kind of shapes, i.e., circle, triangle, pentagon, etc.

The electron emission device 10 further includes an anode 22 maintained at a distance of about several nanometers to several dozen micrometers from the substrate 12 so as to oppose the gate electrode 18. The interspace between the anode 22 and the electron emission cathode 14 is a vacuum of about $10^{-2}$ to $10^{-5}$ Torr. By applying a voltage of several dozen to several hundred volts between the electron emission cathode 14 and the gate electrode 18 and a voltage of several hundred to several thousand volts between the electron emission cathode 14 and the anode 22, the voltage applied between the electron emission cathode 14 and the gate electrode 18 causes electrons to be emitted from the surface of the electron emission cathode 14. Most of the emitted electrons are emitted toward the anode 22, while some of the emitted electrons enter the gate electrode 18. The amount of the electrons to be emitted can be adjusted by the voltage applied to the gate electrodes 18.

Figure 1B:
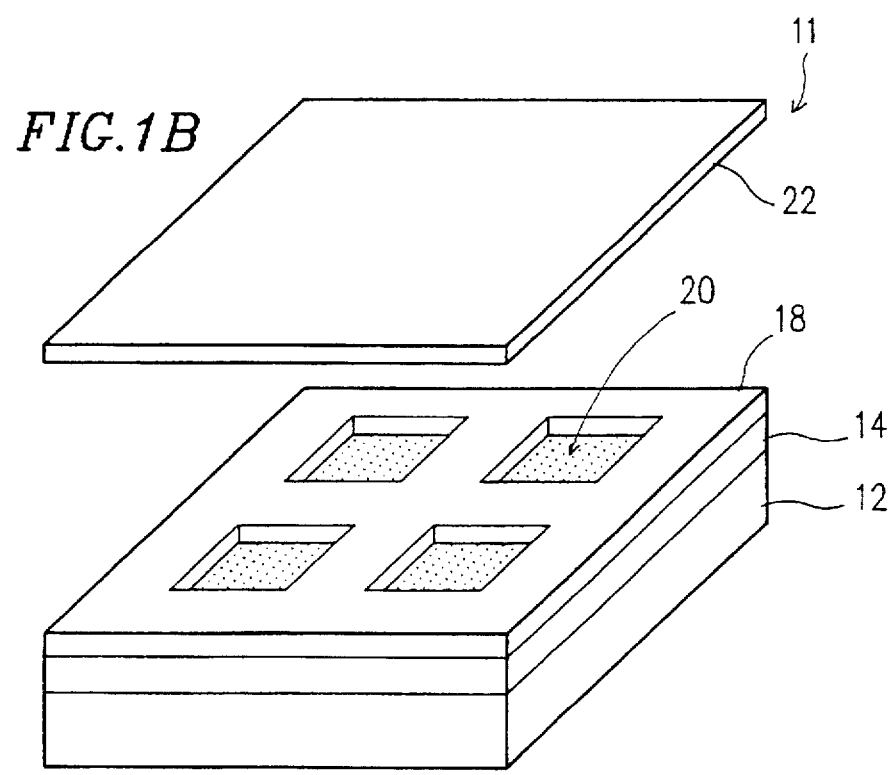
FIG. 1B is a perspective view showing another electron emission device according to Example 1 of the present invention.

Although the electron emission device 10 is shown to have three terminals in FIG. 1A, it is also applicable to provide the electron emission device 10 with only two terminals. In that case, the gate electrode 18 and the insulating film 16 are omitted so that the electron emission cathode 14 directly opposes the anode 22. Alternatively, as shown in FIG. 1B, the gate electrode 18 is directly formed on the electron emission cathode 14. In this case, a portion of the electrons flowing between the gate electrode 18 and the electron emission cathode 14 as an electric current is emitted from the electron emission cathode 14 through the opening 20.

Figure 2:
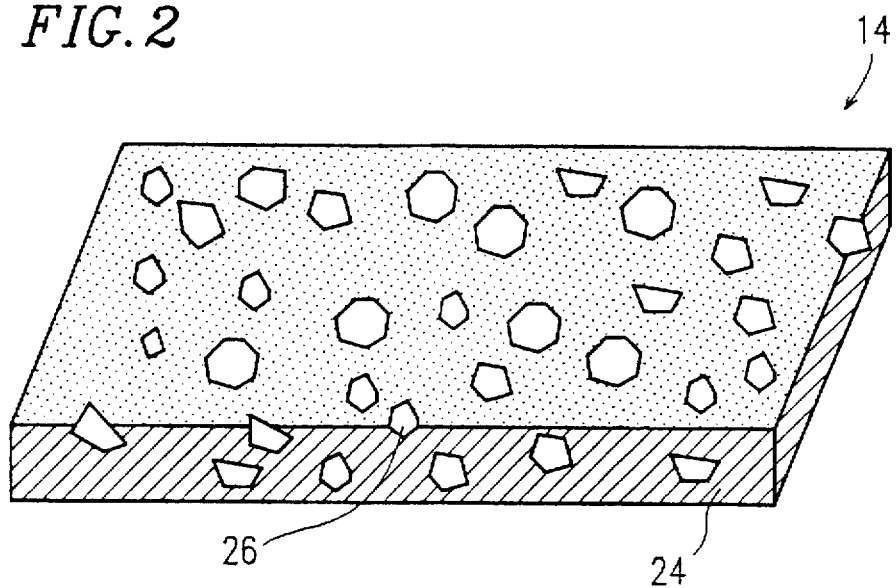
FIG. 2 is a perspective view showing an electron emission cathode used for the electron emission device in FIG. 1.

FIG. 2 is a perspective view showing the electron emission cathode 14. As shown in FIG. 2, the electron emission cathode 14 is composed of a carbon film 24 to which diamond particles 26 are added. The diamond particles 26 are of the p-type conductivity. At least some of the diamond particles 26 project in part from the surface of the carbon film 24. It is preferable that the surfaces of the diamond particles 26 are terminated with hydrogen atoms so that the electric conductivity at the surfaces is improved.

Electrons are usually moving about inside the carbon film 24. When an electric field is applied to the surface of the diamond particles 26 through the carbon film 24, the electrons inside the carbon film 24 transit to a surface level of the diamond particles 26. Diamonds naturally have a very small electron affinity and are therefore suitable for an electron emitting material. Particularly, the (111) face of a diamond has a negative electron affinity, and the vacuum level is lower than the conduction level at the (111) face. As a result, the electrons at the surface level of the diamond particles 26 are emitted into the vacuum via the conduction level of the (111) face.

The emission of electrons into the vacuum is due to the negative electron affinity, so that it does not require a high applied voltage, and occurs with a large transition probability. Therefore, a very large number of electrons can be emitted at a very low voltage. Moreover, this electron emission mechanism does not require the high vacuum which a conventional electron emission device requires. The electron emission device 10 can emit electrons under a vacuum on the level of only about $10^{-2}$ to $10^{-5}$ Torr.

The electron emission device 10 is produced by the following method, for example.

First, the electron emission cathode 14 is formed on the substrate 12. Diamond particles having the p-type conductivity are mixed with fine powder of carbon, to which an appropriate solvent is added so as to form a paste. The grain diameters of the diamond particles 26 are preferably in the range of several nanometers to several micrometers. Thereafter, a film is formed of the paste with an appropriate thickness on the substrate 12 and is baked so as to give the carbon film 24. The diamond particles 26 can be ensured to partially project from the surface of the carbon film 24 by forming the carbon film 24 so as to have a thickness smaller than the grain diameters of the diamond particles 26. By the sintering process, a surface level is created owing to bonding on the atomic level, or atomic interaction, between the carbon in the carbon film 24 and the diamond particles 26. Thus, it becomes easy for electrons to move from the carbon film 24 to the diamond particles 26.

The substrate 12 can be of any material as long as it has heat resistance such that substrate 12 is immune to deformation during the sintering process; it can be conductive or insulative. It is also applicable to form the carbon film 24 on another substrate by the above-described method and then transfer the carbon film 24 onto the substrate 12.

Next, the insulating film 16 and the gate electrode 18 are formed on the electron emission cathode 14 composed of the carbon film 24. The insulating film 16 can be formed of materials such as silicon oxides or silicon nitrides or other insulating materials. The conductive film 18 is composed of a conductive metal such as aluminum.

Thereafter, the openings 20 are formed penetrating the gate electrode 18 and the insulating film 16, so as to expose the surface of the electron emission cathode 14.

Finally, the anode 22 is provided so as to oppose the electron emission cathode 14. The interspace between the anode 22 and the electron emission cathode 14 is sealed so as to maintain a vacuum state, or alternatively the entire anode 22 and the electron emission cathode 14 are contained in a vacuum. Thus, the electron emission device 10 is completed. A conductive element used for conventional electron emission devices, e.g., a transparent electrode formed on a glass substrate, a silicon substrate having a low resistance, etc., can be used for the anode 22.

Although diamond particles having the p-type conductivity are added to a carbon film in the above example, a film composed of any other material can be used as long as it enables efficient injection of electrons into the diamond particles of the p-type conductivity.

Figure 3:
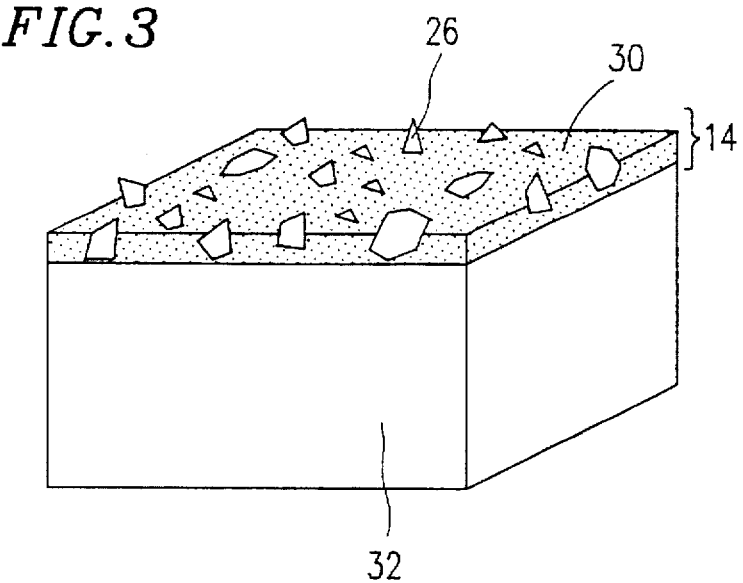
FIG. 3 is a perspective view showing another electron emission cathode according to the present invention.

FIG. 3 is a perspective view showing an electron emission cathode 14 composed of a semiconductor film 30 to which diamond particles 26 are added. Specifically, the semiconductor film 30 is an n-type or a pseudo n-type amorphous carbon film called DLC (Diamond-Like Carbon), which is doped with nitrogen and contains minute diamond particles. The DLC film has a Vickers hardness of about 2000 to 6000 kg/mm$^2$, and can be identified by the specific broad peaks in the vicinity of 1550 cm$^{-1}$ and 1240 cm$^{-1}$ from a Raman scattering spectrum. The term "pseudo n-type" is defined as having little or no n-type characteristics even though having a bandgap and carriers consisting of electrons.

In the case where the semiconductor film 30 is used, it is preferable to form the semiconductor film 30 on an aluminum substrate 32 for supplying the semiconductor film 30 with electrons. By using aluminum, an ohmic contact is obtained between the semiconductor film 30 and the substrate 32.

By incorporating the electron emission cathode 14 of the above configuration, it becomes even easier to provide the p-type diamond particles 26 with electrons, so that a large number of electrons are emitted at a low voltage.

The addition of the diamond particles 26 to the semiconductor film 30 is realized by dispersing the diamond particles 26 on the substrate 32 and thereafter forming the semiconductor film 30 (composed of an n-type DLC film) on the substrate 32. It is also applicable to form the semiconductor film 30 (composed of a DLC film) on the substrate 32 first, press the diamond particles 26 onto the semiconductor film 30, and thereafter bake the semiconductor film 30.

The DLC film can be formed by the following method, for example.

A vapor of pyridine is introduced into a vacuum chamber discharged of air. It is also applicable to bubble an inert gas into pyridine and introduce this to a chamber. Next, a voltage of several dozen to several hundred volts is applied to the pyridine inside the chamber so as to ionize the evaporated pyridine, and the ionized particles are accelerated with a voltage of several thousand volts and deposited on a substrate mounted inside the chamber. Since the deposited film includes nitrogen atoms, the film functions as an n-type semiconductor. It is also applicable to use pyridazine, pyrimidine or derivatives thereof instead of pyridine. It is also applicable to use pyrazine, 1,3,5-triazine, or derivatives thereof dissolved in a solvent such as benzene.

As described above, in the electron emission cathode according to the present example, diamond particles are dispersed in a carbon film or an n-type semiconductor film, so that it can be formed by printing or the like. Accordingly, a large-area electron emission cathode can be produced easily and at low cost. Moreover, since electrons are emitted from a flat face, the electrode is not likely to deteriorate. A different electron emission mechanism from the conventional mechanism makes possible the emission of electrons at a low level of vacuum. Moreover, the amount of electrons to be emitted can be easily controlled by controlling the number of diamond particles in a unit area of the electrode. A considerably larger current per unit area can be obtained as compared with that of a conventional electron emission cathode.

Although a DLC film is used as the semiconductor film 30 in the above example, it is also applicable to use a film composed of other semiconductor materials, such as silicon or germanium or the like.

(EXAMPLE 2)

Figure 4A:
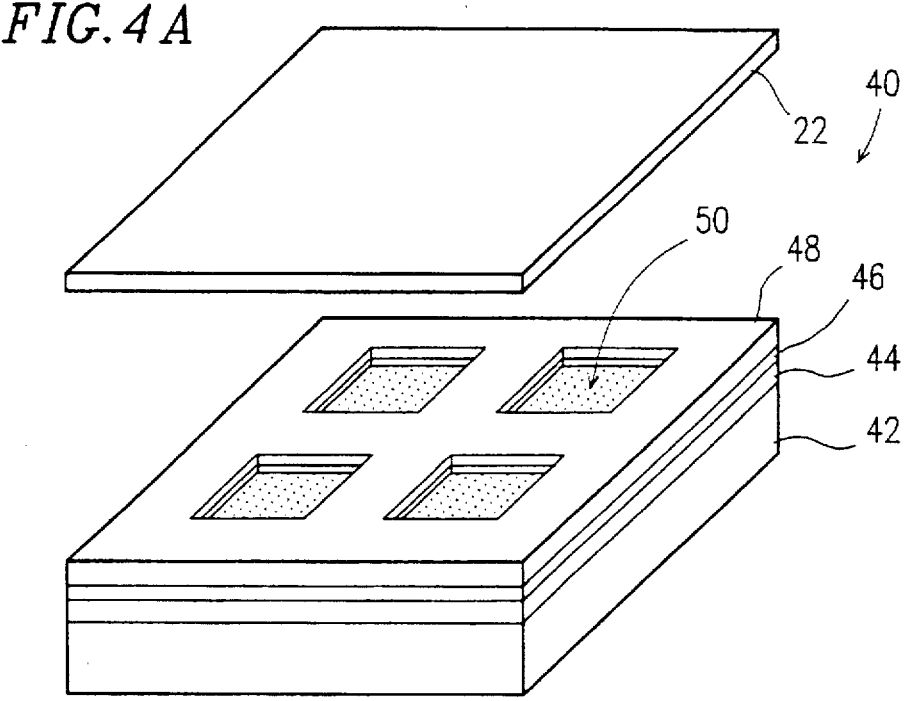
FIG. 4A is a perspective view showing an electron emission device according to Example 2 of the present invention.

FIG. 4A is a perspective view showing an electron emission device 40 according to Example 2 of the present invention. As shown in FIG. 4A, the electron emission device 40 includes an electron emission cathode 44 provided on a substrate 42, an insulating film 46 provided on the electron emission cathode 44, and a gate electrode 48 provided on the insulating film 46. The gate electrode 48 and the insulating film 46 both have openings 50. Portions of the electron emission cathode 44 are exposed at the bottoms of the openings 50.

The electron emission device 40 further includes an anode 22 maintained so as to oppose the electron emission cathode 44 at the openings 50. In the interspace between the anode 22 and the electron emission cathode 44 is a vacuum of about 10$^{-2}$ to 10$^{-5}$ Torr. By applying a voltage of several dozen to several hundred volts between the electron emission cathode 44 and the gate electrode 48 and a voltage of several hundred to several thousand volts between the electron emission cathode 44 and the anode 22, the voltage applied between the electron emission cathode 44 and the gate electrode 48 causes electrons to be emitted from the surface of the electron emission cathode 44. Most of the emitted electrons are emitted toward the anode 22, while some of the emitted electrons enter the gate electrode 48. The amount of the electrons to be emitted can be adjusted by the voltage applied to the gate electrodes 48.

Figure 4B:
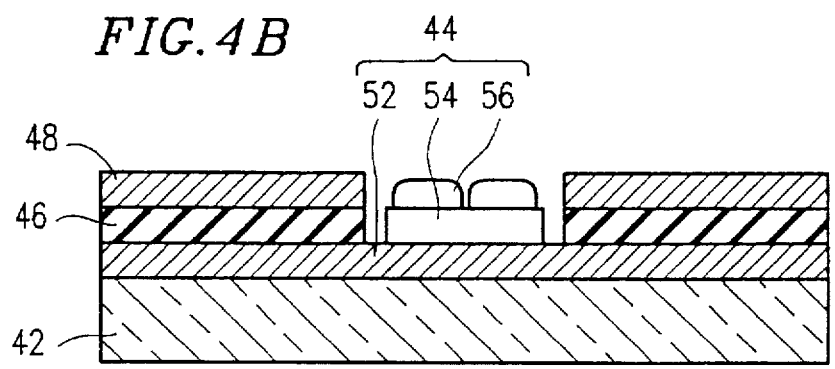
FIG. 4B is a cross-sectional view showing the electron emission device in FIG. 4A.

FIG. 4B is a cross-sectional view showing the electron emission cathode 44. The electron emission cathode 44 includes a conductive film 52, an n-type semiconductor film 54 formed on the conductive film 52, and island-like p-type semiconductor films 56 formed on the n-type semiconductor film 54.

Figure 4C:
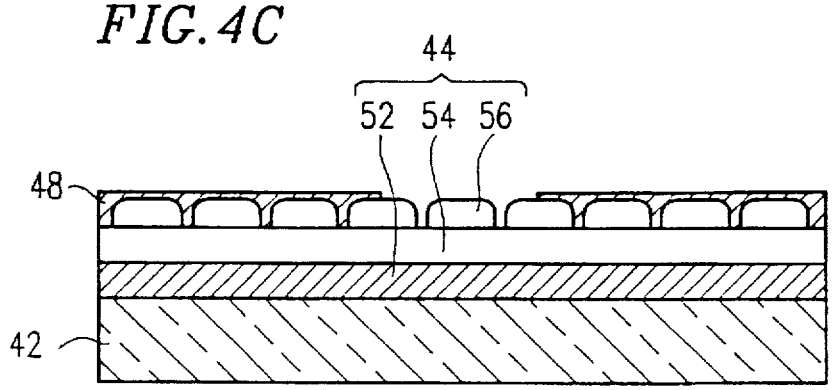
FIG. 4C is a cross-sectional view showing another electron emission device according to Example 2 of the present invention.
Figure 5:
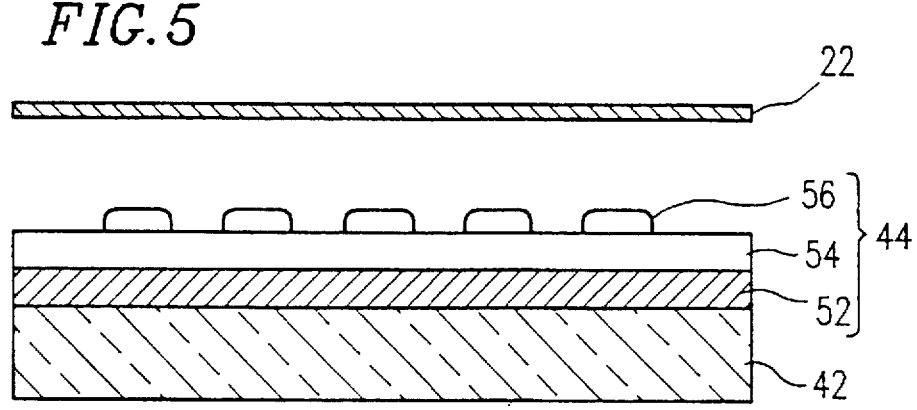
FIG. 5 is a cross-sectional view showing another electron emission device according to the present invention.

Although the electron emission device 40 is shown to have three terminals in FIGS. 4A and 4B, it is also applicable to provide the electron emission device 40 with only two terminals. In that case, the gate electrode 48 and the insulating film 46 are omitted so that the electron emission cathode 44 directly opposes the anode 22, as shown in FIG. 5. Alternatively, as shown in FIG. 4C, the gate electrode 48 is directly formed on the electron emission cathode 14. In this case, a portion of the electrons flowing between the gate electrode 48 and the electron emission cathode 44 as an electric current is emitted from the electron emission cathode 44 through the opening 50.

Hereinafter, the operation of the electron emission device 40 according to the present example will be described.

When an n-type semiconductor and a p-type semiconductor are brought into contact with each other, carriers will diffuse from the side with a higher density to the side with a lower density at the junction face. As a result, carriers disappear in the vicinity of the junction face, so that a diffusion potential emerges between the n-type semiconductor and the p-type semiconductor in a thermal equilibrium state. Assuming that the value of the diffusion potential is $eV_D$, the lower end of the p-type semiconductor has an energy level which is higher by $eV_D$ than the energy level at the lower end of the n-type semiconductor. Therefore, when electrons to become the minority carriers in the p-type semiconductor are injected into the conduction band, it is more advantageous to let electrons be emitted from the conduction band of the p-type semiconductor than from the conduction band of the n-type semiconductor in terms of energy utilization.

Figure 6:
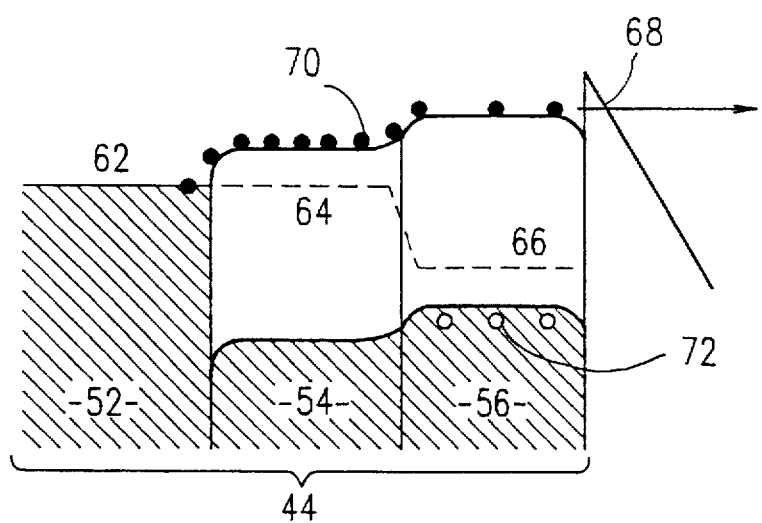
FIG. 6 is a schematic energy band diagram of an electron emission cathode used for the electron emission device in FIGS. 4A, 4B and 5.

FIG. 6 is a schematic energy band diagram of the electron emission cathode 44 in the case where a negative voltage with respect to the anode 22 is applied to the conductive film 52.

The conductive film 52, the n-type semiconductor film 54, and the p-type semiconductor film 56 have their respective Fermi levels 62, 64, and 66 as shown in FIG. 6. A potential barrier 68 is formed between the vacuum level and an end of the conduction band of the p-type semiconductor film 56.

Owing to the voltage applied between the anode 22 and the conductive film 52, electrons 70 are injected from the conductive film 52 to the conduction band of the n-type semiconductor film 54. Owing to the applied voltage, the electrons 70 are injected into the conduction band of the p-type semiconductor film 56, which has a higher energy level. As described above, the electron affinity seemingly becomes smaller in the p-type semiconductor film 56 than in the conduction band of the n-type semiconductor film 54. As a result, the electrons 70 injected into the p-type semiconductor film 56 are released into the vacuum by being tunneled through the potential barrier 68, which is created by the vacuum level but has become thinner due to the applied voltage, and are captured by the anode 22.

The behavior of the electrons 70, which are the minority carriers in the p-type semiconductor film 56, is important. In some cases, the electrons 70 in the conduction band of the p-type semiconductor film 56 are generated by being excited from the valence band of the p-type semiconductor film 56 and the surface level of the p-type semiconductor 56 due to thermal energy or the like; in other cases, the electrons 70 in the conduction band of the p-type semiconductor film 56 are injected from the n-type semiconductor film 54. In order to prevent the electrons 70 in the p-type semiconductor film 56 from disappearing through recombination with holes 72, which are the majority carriers in the p-type semiconductor film 56, the distance travelled by the electrons 70 flowing through the p-type semiconductor film 56 when being released into the vacuum should be smaller than the diffusion length of the electrons 70 in the p-type semiconductor film 56. Accordingly, in the case of a PN junction in which thin layers of the n-type semiconductor film 54 and the p-type semiconductor film 56 are deposited on each other, the thickness of the p-type semiconductor film 56 should be reduced in order to avoid the above-mentioned problem. However, it is difficult to uniformly produce a very thin film. Therefore, the electron emission device according to the present example features the island-like p-type semiconductor films 56 partially deposited on the n-type semiconductor film 54.

Figure 7:
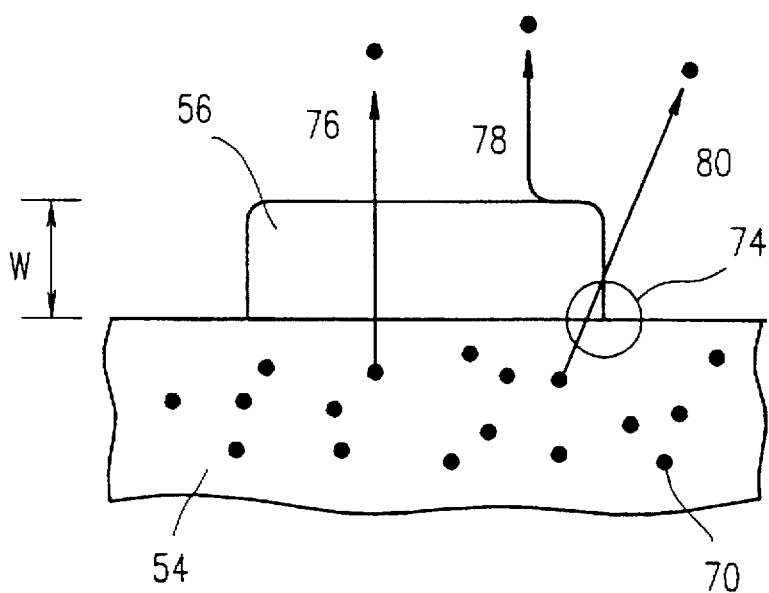
FIG. 7 is a schematic diagram describing how electrons are released from the electron emission cathode used for the electron emission device in FIGS. 4A, 4B

FIG. 7 is a magnified cross-sectional view showing the junction between the n-type semiconductor film 54 and the p-type semiconductor film 56. In the case where the thickness W is smaller than the diffusion length of the electrons 70, the electrons 70 are released across the p-type semiconductor film 56 as shown by a trajectory 76.

On the other hand, in the case where the thickness W is larger than the diffusion length of the electrons 70, it is difficult to release the electrons 70 along the trajectory 76 as shown in FIG. 7. However, in the vicinity of a PN junction 74, the electrons 70 injected from the n-type semiconductor film 54 can diffuse into the surface of the p-type semiconductor film 56. As shown by a trajectory 80, the electrons 70 which have diffused into the surface of the p-type semiconductor film 56 become capable of being released into the vacuum before recombining with the holes in the p-type semiconductor film 56. Some kinds of semiconductors for composing the p-type semiconductor film 56 allow the electrons 70 to flow on the surface of the p-type semiconductor film 56 and be released from the surface of the p-type semiconductor film 56 as shown by the trajectory 78. The trajectories 76, 78, and 80 are intended as exemplary trajectories, and the actual paths of electron release may not necessary follow these trajectories.

Thus, according to the present example, the p-type semiconductor films partially deposited on the n-type semiconductor film ensure that the electron affinity seemingly reduces, thereby making it easy for the electrons diffused through the p-type semiconductor film to reach the surface of the p-type semiconductor film. As a result, electrons can be effectively emitted.

An exemplary method for producing the electron emission device 40 will be described with reference to FIGS. 4A, 4B, and 5.

First, the electron emission cathode 44 is formed on the substrate 42. The conductive film 52 is formed on the substrate 42, and the n-type semiconductor film 54 is formed on the conductive film 52. Thereafter, the p-type semiconductor film 56 is deposited on the n-type semiconductor film 54 in a short time which will not allow the p-type semiconductor film 56 to entirely cover the n-type semiconductor film 54. Alternatively, it is applicable to form a p-type semiconductor layer which entirely covers the n-type semiconductor film 54 and thereafter remove a portion of the p-type semiconductor layer by selective etching so as to leave the island-like p-type semiconductor films 56. It is also applicable to obtain the p-type semiconductor films 56 by forming a p-type semiconductor layer on the n-type semiconductor film 54 using a mask having island-like openings and remove the mask, or by dispersing a fine particle-like p-type semiconductor over the surface of the n-type semiconductor film 54. It is preferable to form the p-type semiconductor films 56 into islands having a size of about several nanometers to several micrometers. The conductive film 52 and the n-type semiconductor film 54 are so selected as to result in an ohmic contact therebetween, so that the injection of the electrons from the conductive film 52 into the n-type semiconductor film 54 becomes easy. Thus, the electron emission cathode 44 is formed. The n-type semiconductor film 54 and the p-type semiconductor film 56 can be formed of diamond or a DLC film which are doped with boron, phosphorus, or nitrogen.

The insulating film 46 and the gate electrode 48 are formed on the electron emission cathode 44. The insulating film 46 can be composed of silicon oxides, silicon nitrides, or the like, as well as other insulating materials. The gate electrode 48 is composed of a conductive material such as aluminum. Thereafter, the openings 50 are formed penetrating the gate electrode 48 and the insulating film 46, so as to expose the surface of the electron emission cathode 44. In the case of forming an electron emission device of the structure shown in FIG. 5, it is not necessary to form the gate electrodes 48 and the insulating film 46.

Finally, the anode 22 is provided so as to oppose the electron emission cathode 44. The interspace between the anode 22 and the electron emission cathode 44 is sealed so as to maintain a vacuum state, or alternatively the entire anode 22 and the electron emission cathode 44 are contained in a vacuum. Thus, the electron emission device 40 is completed.

As illustrated below, various modifications may be made to the electron emission cathode 44 as described in the above example.

Figure 8:
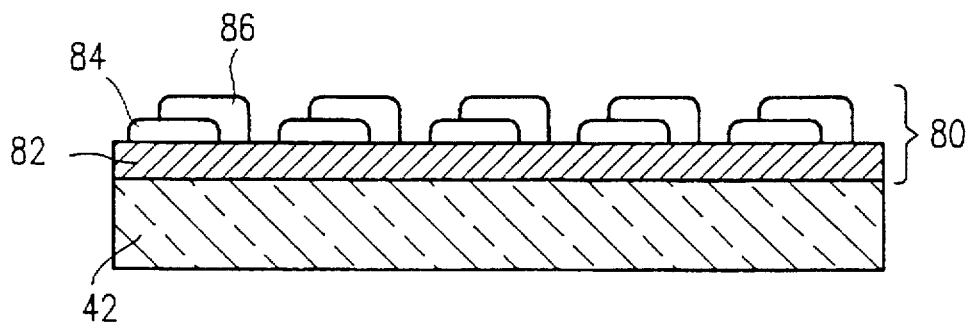
FIG. 8 is a cross-sectional view showing another electron emission cathode according to the present invention.

FIG. 8 schematically shows a cross-section of the electron emission cathode 80. The electron emission cathode 80 includes a conductive film 82 formed on a substrate 42, island-like n-type semiconductor films 84 formed on the conductive film 82, and island-like p-type semiconductor films 86 formed on the conductive film 82 so as to partially overlap with the n-type semiconductor films 84. The island-like n-type semiconductor films 84 and the island-like p-type semiconductor films 86 can be formed by the same method as that used for the electron emission cathode 44 described above.

The electron emission cathode 80 is similarly capable of emitting electrons when incorporated in the electron emission device 40 shown in FIG. 4A or 5 in the place of the electron emission cathode 44.

Since the interfaces between the n-type semiconductor films 84 and the p-type semiconductor films 86 are exposed on the surface, electrons which diffused through the p-type semiconductor films 86 by way of the interiors or the surfaces of the n-type semiconductor films 84 can easily arrive at the surfaces of the p-type semiconductor films 86 in the vicinity of the interfaces. Since the p-type semiconductor films 86 has a pseudo-electron affinity which is smaller than that of the n-type semiconductor films 84 by applying the voltage to the p-type semiconductor films 86, electrons can be efficiently released from the surface of the p-type semiconductor films 86.

An electron emission cathode 90 shown in FIG. 9 includes a conductive film 92 formed on a substrate 42, island-like-n-type semiconductor films 94 formed on the conductive film 92, and p-type semiconductor films 96 formed on the n-type semiconductor films 94. This structure is obtained by forming an n-type semiconductor layer that covers the entire conductive film 92, forming island-like p-type semiconductor films 96 on the n-type semiconductor layer, and etching the n-type semiconductor layer using the p-type semiconductor films 96 as masks, whereby the island-like n-type semiconductor films 94 result.

The electron emission cathode 90 is similarly capable of emitting electrons when incorporated in the electron emission device 40 shown in FIG. 4A or 5 in the place of the electron emission cathode 44.

Since the interfaces between the n-type semiconductor films 94 and the p-type semiconductor films 96 are exposed on the surface, electrons which diffused through the p-type semiconductor films 96 by way of the interiors or the surfaces of the n-type semiconductor films 94 can easily arrive at the surfaces of the p-type semiconductor films 96 in the vicinity of the interfaces. Since the p-type semiconductor films 96 has a pseudo-electron affinity which is smaller than that of the n-type semiconductor films 94 by applying the voltage to the p-type semiconductor films 96, electrons can be efficiently released from the surface of the p-type semiconductor films 96.

An electron emission cathode 100 shown in FIG. 10 includes a conductive film 102 formed on a substrate 42, an n-type semiconductor film 104 formed on the conductive film 102, and a p-type semiconductor film 106 formed on the n-type semiconductor film 104, the p-type semiconductor film 106 having openings 108. The p-type semiconductor film 106 having the openings 108 can be obtained by forming the n-type semiconductor film 104 so as to cover the entire conductive film 102, forming island-like masks defining the openings 108, and thereafter forming the p-type semiconductor film 106 on the n-type semiconductor film 104, the masks being removed by a lift-off method.

The electron emission cathode 100 is similarly capable of emitting electrons when incorporated in the electron emission device 40 shown in FIG. 4A or 5 in the place of the electron emission cathode 44.

Since the interface between the n-type semiconductor film 104 and the p-type semiconductor film 106 is exposed on the surface, electrons which diffused through the p-type semiconductor film 106 by way of the interior or the surface of the n-type semiconductor film 104 can easily arrive at the surface of the p-type semiconductor film 106 in the vicinity of the interface. Since the p-type semiconductor films 106 have a pseudo-electron affinity which is smaller than that of the n-type semiconductor films 104 by applying the voltage to the p-type semiconductor films 106, electrons can be efficiently released from the surface of the p-type semiconductor films 106.

An electron emission cathode 110 shown in FIG. 11 includes a conductive film 112 formed on a substrate 42, an n-type semiconductor film 114 formed on the conductive film 112, and a p-type semiconductor film 116 formed on the n-type semiconductor film 114, the n-type semiconductor films 114 and the p-type semiconductor film 116 having a plurality of openings 118. The conductive film 112 is partially exposed at the bottoms of the openings 118. The openings 118 can be formed by etching with a photoresist, anodic oxidation, or the like. By etching with a photoresist, the openings 118 can be formed so as to have diameters on the order of micrometers (μm). By anodic oxidation, the openings 118 can be formed so as to have diameters on the order of nanometers (nm). There are no particular limits to the diameters and number of openings 118.

The electron emission cathode 110 is similarly capable of emitting electrons when incorporated in the electron emission device 40 shown in FIG. 4A or 5 in the place of the electron emission cathode 44.

Since the interface between the n-type semiconductor film 114 and the p-type semiconductor film 116 is exposed on the surface, electrons which diffused through the p-type semiconductor film 116 by way of the interior or the surface of the n-type semiconductor film 114 can easily arrive at the surface of the p-type semiconductor film 116 in the vicinity of the interface. Since the p-type semiconductor films 116 has a pseudo-electron affinity which is smaller than that of the n-type semiconductor films 114 by applying the voltage to the p-type semiconductor films 116, electrons can be efficiently released from the surface of the p-type semiconductor films 116.

As described above, the electron emission cathode of the present example has a structure in which electrons are supplied from an n-type semiconductor film and the vicinity of the junction between the n-type semiconductor film and a p-type semiconductor film is exposed in a vacuum. As a result, electrons injected from the n-type semiconductor film to the p-type semiconductor film follow a path which permits release into the vacuum before re-combining with holes in the p-type semiconductor film. Thus, electrons are efficiently released from the p-type semiconductor film, which has a smaller electron affinity as compared with that of the n-type semiconductor film.

Moreover, no projection-shaped electron emission portions are required. Therefore, the electron emission cathode can be formed on various types of substrates, and it is easy to form electron emission cathodes having large areas. Because of the lack of projections, concentration of electric fields is not likely to occur, thereby resulting in very small change in the condition of the electrode over time.

Although a conductive film is formed on the substrate 42 in the above example, no conductive film is required on the substrate 42 if the substrate 42 itself is conductive. It is also applicable to use an n-type semiconductor substrate, regarding the substrate and the n-type semiconductor film as one integral unit.

Use of boron-doped diamond as the p-type semiconductor will result in an even more effective electron emission device as described in Example 1 because of the very small electron affinity of diamond relative to other materials; and certain crystal faces of diamond have electron negative affinities. Such an electron emission device is also capable of operating in a low degree (about $10^{-2}$ Torr) of vacuum because diamond is inactive to atmospheres, while a silicon-based electron emission device requires a certain degree of vacuum because it is susceptible to contamination in an open atmosphere, i.e., because of formation of oxide films. It is preferable that the surface of the diamond is terminated with hydrogen atoms so as to obtain outstanding electric conduction on the diamond surface.

Use of diamond as the n-type semiconductor film seems possible, but it is difficult to obtain n-type diamond having sufficient characteristics. Therefore, is preferable to use a DLC film containing minute diamond particles for the n-type semiconductor film as described in Example 1. In this case, aluminum can be suitably used as the conductive film so as to obtain excellent ohmic contact.

Further, in the electron emission cathode explained above, the n-type semiconductor film is formed on the conductive film and the p-type semiconductor film is formed on the n-type semiconductor film. However, an electron emission cathode can include an p-type semiconductor film formed on a conductive film and an n-type semiconductor film formed on the p-type semiconductor film. This is because exposure of an p-n junction to a vacuum atmosphere brings some effects of the present invention.

(EXAMPLE 3)

In the present example, flat displays incorporating the electron emission cathode or electron emission device described in Examples 1 and 2 will be described.

Figure 12A:
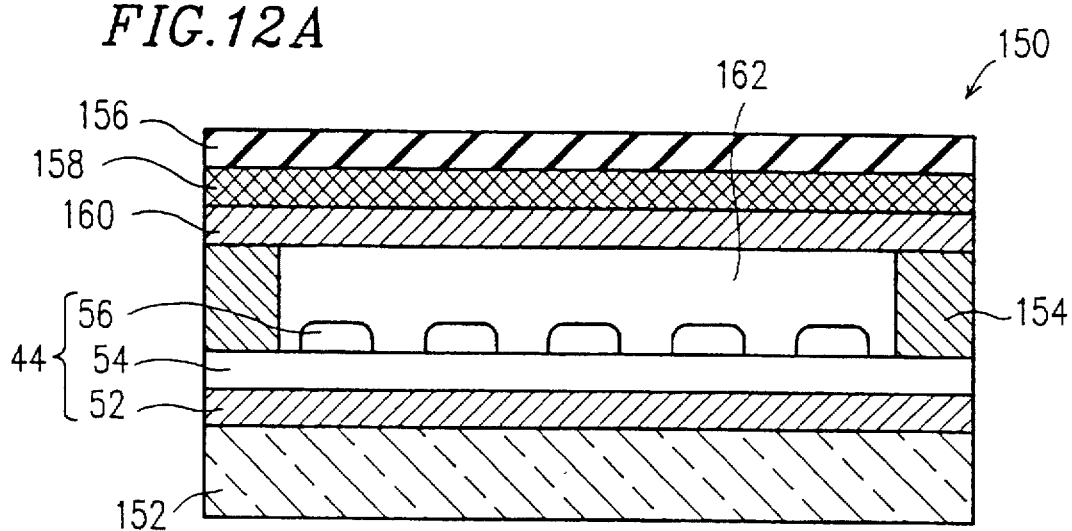
FIG. 12A is a schematic cross-sectional view showing a flat display according to the present invention.

FIG. 12A is a schematic cross-sectional view showing the flat display 150. Although FIG. 12A illustrates an example where the electron emission cathode 44 described in Example 2 (shown in FIG. 5) is used, any of the electron emission cathodes described in Examples 1 and 2 can be used for the flat display 150.

In the flat display 150, an electron emission cathode 44 including a conductive film 52, an n-type semiconductor film 54, and p-type semiconductor films 56 as described in Example 2 is formed on a support substrate 152.

The flat display 150 further includes a transparent substrate 156 composed of glass or the like. A transparent electrode 158 composed of ITO (Indium Tin Oxide) or the like is formed on the transparent substrate 156, with a fluorescent film 160 being provided thereon. The fluorescent film 160 is composed of an inorganic material such as ZnO:Zn or an organic material such as a fluorescent dye and a fluorescent conductive polymer.

The transparent substrate 156 and the support substrate 152 are maintained at some distance from each other, with an insulator 154 interposed therebetween, so that the transparent electrode 158 and the electron emission cathode 44 oppose each other. In an interspace 162 created between the transparent substrate 156 and the support substrate 152 is a vacuum.

By applying a voltage between the transparent electrode 158 and the electron emission cathode 44 of the flat display 150, electrons are released from the electron emission cathode 44 and accelerated. The accelerated electrons collide with the fluorescent film 160 on the transparent electrode 158 and are excited so as to emit light.

In the flat display 150, the transparent electrode 150 can be omitted, in the case where an accelerating means is provided between the electron emission cathode 44 and the transparent substrate 156 instead of the transparent electrode 150. In this case, it is preferable to provide a thin aluminum film on the fluorescent film 160.

Figure 12B:
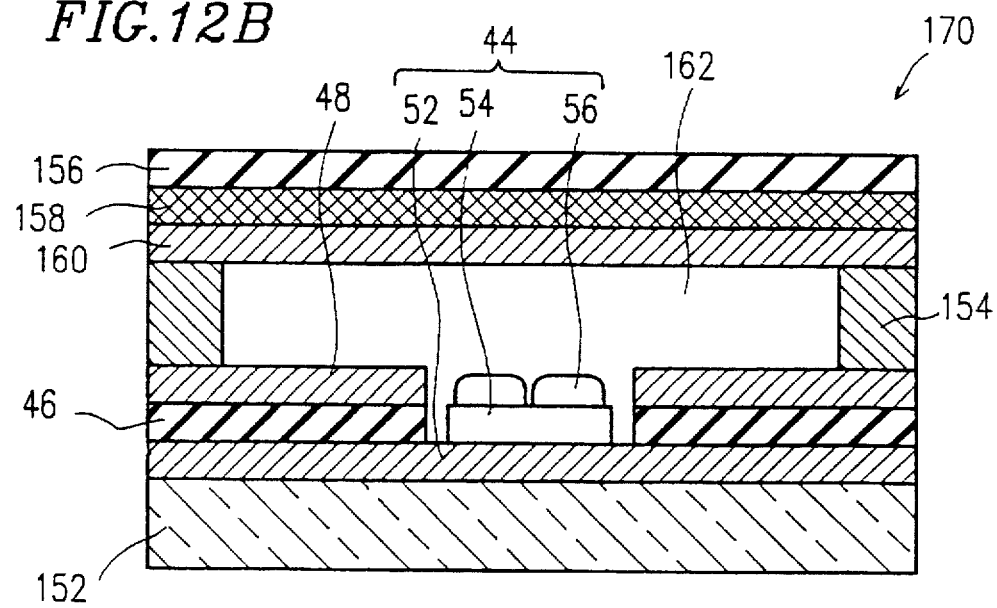
FIG. 12B is a schematic cross-sectional view showing a flat display according to the present invention.

It is also applicable to provide a gate electrode 48 for drawing out electrons adjacent to the electron emission cathode 44, as in a flat display 170 shown in FIG. 12B. The gate electrode 48 is provided on the electron emission cathode 44 with an insulating film 46 interposed therebetween. As is explained in Example 2 in reference to FIG. 4C, the gate electrode 48 can be formed on the electron emission cathode 44 directly. Constituent elements in FIG. 12B which also appear in the flat display 150 in FIG. 12A are indicated by the same reference numerals as used therein. In the flat display 170, electrons are drawn out from the electron emission cathode 44 by a voltage applied between the gate electrode 48 and the electron emission cathode 44, and accelerated by a transparent electrode 158 (which is an anode), so that a fluorescent film 160 on the transparent electrode 158 is excited so as to emit light.

The flat display 150 in FIG. 12A has two terminals and therefore has a simple structure. The flat display 170 in FIG. 12B has three terminals and therefore has a relatively complicated structure, but facilitates gray scale display because of its gate electrode.

Figure 13:
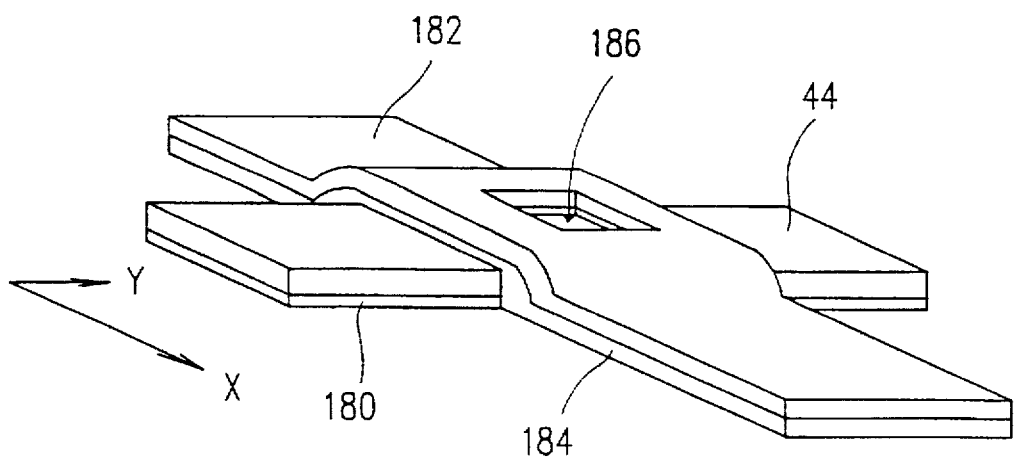
FIG. 13 is a perspective view showing the structure of an electron emission cathode suitably used for the flat display in FIG. 12A or 12B, the electron emission cathode corresponding to one pixel.

In order to construct a flat display having a plurality of pixels, an electron emission cathode having the structure shown in FIG. 13 can be used. FIG. 13 is a perspective view showing the structure of an electron emission cathode corresponding to one pixel. As shown in FIG. 13, a stripe-shaped signal electrode line 180 is formed so as to extend along direction Y, with an electron emission cathode described in Example 1 or 2 being provided on the stripe-shaped signal electrode line 180. Furthermore, a stripe-shaped gate electrode line 182, extending along direction X, is formed on the signal electrode line 180, thus intersecting the signal electrode line 180 with an insulating film 184 interposed therebetween. In the intersection of the gate electrode line 182 and the signal electrode line 180, an opening 186 is formed in the gate electrode line 182 so as to expose the surface of the electron emission cathode 44. An insulating film can be provided, if necessary, for portions of the electron emission cathode 44 which do not intersect the gate electrode line 182.

A flat display with a plurality of pixels can be realized by formulating the above-mentioned structures with a plurality of signal electrode lines 180 and a plurality of gate electrode lines 182 so as to construct a substrate on which a matrix of pixels are provided, and disposing the substrate opposite a transparent substrate carrying transparent electrodes provided with fluorescent films.

(EXAMPLE 4)

As described in Examples 1 and 2, the electron emission cathode of the present invention is capable of emitting a large number of electrons in a vacuum at a high efficiency. By utilizing this feature, a thermoelectric cooling device with a novel structure can be realized.

Figure 14:
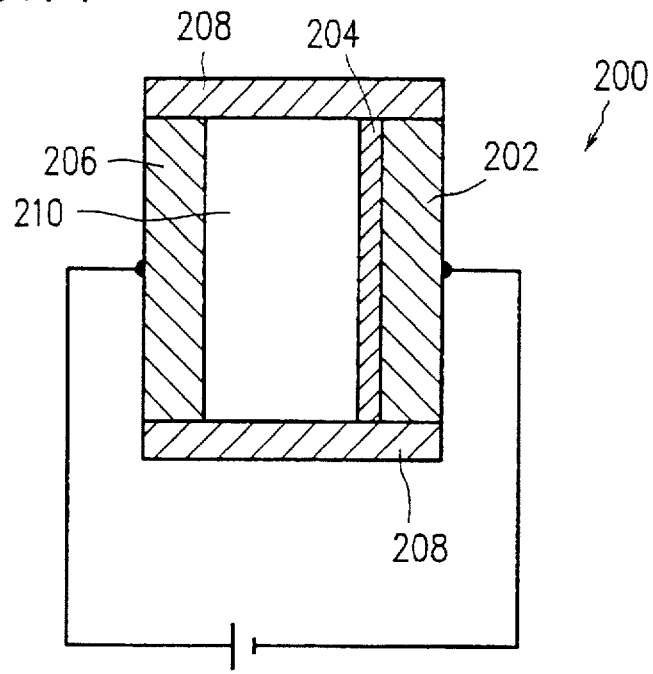
FIG. 14 is a schematic cross-sectional view showing a thermoelectric cooling device according to the present invention.

FIG. 14 is a schematic cross-sectional view showing a thermoelectric cooling device 200. The thermoelectric cooling device 200 includes a first conductive substrate 202, a cathode 204 formed on the first conductive substrate 202, and a second conductive substrate 206. Any of the electron emission cathodes described in Examples 1 and 2 can be used as the cathode 204. The first conductive substrate 202 and the second conductive substrate 206 are disposed so as to oppose each other with the cathode 204 facing inward. In an interspace 210 between the first conductive substrate 202 and the second conductive substrate 206 is a vacuum sealed with sealing glass 208. The interval between the first conductive substrate 202 and the second conductive substrate 206 is kept at about 100 μm or less.

By applying a voltage to the second substrate 206 so that the first conductive substrate 202 is at a minus potential, electrons flowing from a power supply move from the first conductive substrate 202 to the cathode 204. At this point of time, the first conductive substrate 202 absorbs heat owing to a Peltier effect.

As described in Example 1 or 2, the cathode 204 is capable of emitting electrons into a vacuum at a high efficiency. Therefore, electrons which flowed from the first conductive substrate 202 into the cathode 204 are drawn out into the vacuum 210, so that the first conductive substrate 202 or the cathode 204 is deprived of heat owing to an electron evaporation effect.

The emitted electrons, after being drawn out into the vacuum 210, enter the second conductive substrate 206 opposing the first conductive substrate 202. At this point, electrons release their own potential energy and kinetic energy as heat, so as to heat the second conductive substrate 206.

Accordingly, when operating the thermoelectric cooling device 200, the first conductive substrate 202 is cooled, whereas the second substrate 206 is heated. Since the conductive substrates 202 and 206 interpose the vacuum 210, the vacuum 210 prevents heat from being transmitted from the second substrate 206 to the first substrate 202, thus preventing any substantial decrease in the cooling or heating efficiency due to leakage of heat. The heating effect increases as more heat is taken away from the first conductive substrate 202 and as a higher voltage for drawing out electrons is applied.

Thus, a high-efficiency and high-power thermoelectric cooling device is obtained. Since the electrode can be composed of a metal plate and a thin film, it is not necessary to use a large amount of rare metals as in the case of a conventional Peltier element, indicative of an advantage in resource efficiency. Since only small amounts of respective materials are required, the device can be made to have a small weight, while incurring only a low production cost. Since the vacuum interspace is designed to be narrow, it is possible to realize a very thin cooling device.

As illustrated below, various modifications may be made to such a thermoelectric cooling device.

Figure 15:
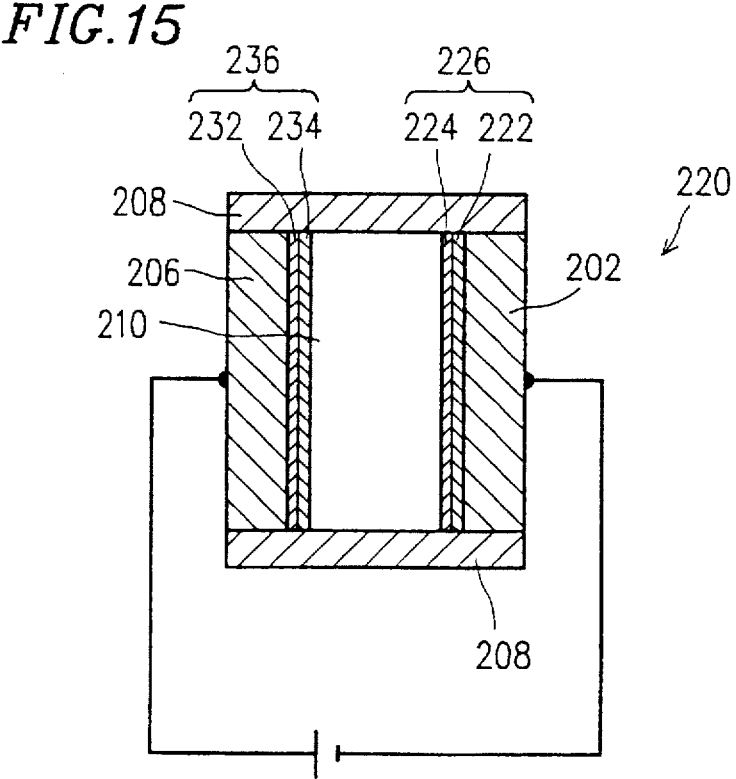
FIG. 15 is a schematic cross-sectional view showing another thermoelectric cooling device according to the present invention.
Figure 18:
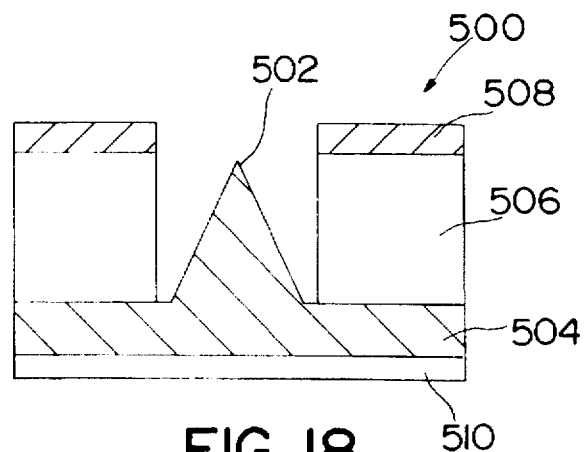
FIG. 18 is a cross-sectional view showing a conventional electron emission device.
Figure 19:
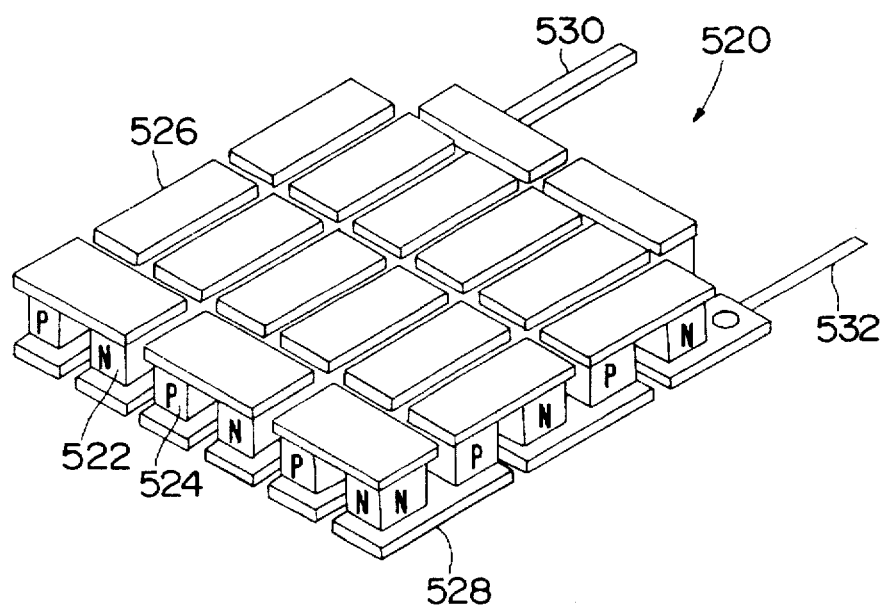
FIG. 19 is a perspective view showing a conventional thermoelectric cooling device.

A thermoelectric cooling device 220 shown in FIG. 15 includes a cathode 226 instead of the cathode 204 of the thermoelectric cooling device 200 shown in FIG. 14. The cathode 226 includes an n-type semiconductor film 222 and a cesium oxide film 224 formed on the surface of the n-type semiconductor film 222. Furthermore, the thermoelectric cooling device 220 includes an anode 236 formed on a face of a second conductive substrate 206 that opposes the first conductive substrate 202. The anode 236 includes a p-type semiconductor film 232 and a cesium oxide film 234.

Since cesium oxide has a small work function, the above configuration is capable of releasing electrons into a vacuum at a high efficiency. By constructing the semiconductor film 222 of the cathode 226 and the semiconductor film 232 of the anode 236 of semiconductors having opposite conductivity types (i.e., n-type and p-type, respectively), the voltage to be applied between the first conductive substrate 202 and the second conductive substrate 206 can be reduced. Furthermore, by reversing the direction of flow of the current, it becomes possible to cool the second conductive substrate 206 and heat the first conductive substrate 202.

A thermoelectric cooling device 240 shown in FIGS. 16A and 16 B includes an n-type semiconductor film 242 instead of the cathode 226 of the thermoelectric cooling device 220 shown in FIG. 15, and a p-type semiconductor film 246 instead of the anode 236 of the thermoelectric cooling device 220. The n-type semiconductor film 242 has a plurality of minute projections 244 on the surface thereof. The p-type semiconductor film 246 also has a plurality of minute projections 244 on the surface thereof.

In accordance with the above structure, it is possible to release electrons into a vacuum even by using a semiconductor material having a relatively large work function.

The minute projections 244 can be directly formed on the n-type semiconductor film 242 and the p-type semiconductor film 246. Alternatively, the minute projections 244 can be obtained by forming minute projections on a first conductive substrate 202 and a second conductive substrate 206 and thereafter forming the n-type semiconductor film 242 and the p-type semiconductor film 246 on the respective surfaces.

It is also possible to modify the exterior configuration of the thermoelectric cooling device.

A thermoelectric cooling device 300 shown in FIG. 17 includes a cylindrical conductor 302 functioning as a first conductive substrate, a cathode 304 provided on the surface of the cylindrical conductor 302, a cylindrical conductor 306 functioning as a second conductive substrate, and an anode 308 provided on the inner wall face of the cylindrical conductor 306. The cylindrical conductor 306 is disposed so as to be coaxial with the cylindrical conductor 302.

Any of the cathodes and anodes described with reference to FIGS. 15, 16A and 16B can be used as the cathode 304 and the anode 308, respectively. It is also applicable to use any of the electron emission cathodes described in Examples 1 and 2 as the electron emission cathode 304 while omitting the anode 308.

The cylindrical conductor 302 and the cylindrical conductor 306 are fixed with sealing members 312 so as to contain a vacuum 310. A plurality of fins 314 and 316 are provided on the inner wall face of the cylindrical conductor 302 and the outer wall face of the cylindrical conductor 306, respectively.

Electrons which flowed out from a power supply enter the cylindrical conductor 302 and absorbs heat when they move to the cathode 304 formed on the surface of the cylindrical conductor 302, owing to the Peltier effect. This heat absorption effect works for a fluid flowing around the fins 314 so that the fluid is deprived of heat, i.e., cooled down. On the other hand, electrons which entered the cathode 304 are drawn out from the surface of the cathode 304 by a voltage applied between the cylindrical conductor 306 and the cylindrical conductor 302, fly about in the vacuum 310, travel through the anode 308, and enter the cylindrical conductor 306, when the electrons release the energy they retained so as to heat the cylindrical conductor 306. The radiated heat is transmitted through the fins 316 to reach a fluid flowing on the outside of the fins 316, thus heating the fluid. In accordance with this structure, even if made very compact, fluids can be cooled or heated with a high efficiency.

The cylindrical conductors 302 and 306 can have any shape as long as they function as the first conductive substrate and the second conductive substrate, respectively, although cylindrical shapes will provide better heat efficiency. For example, the cylindrical conductors 302 and 306 can have a polygonal shape instead of a cylindrical shape.

As will be appreciated, in accordance with the thermoelectric cooling device of the present example, the heating member and the cooling member are isolated from each other by a minute vacuum interspace, so that quantity of heat leaking from the high-temperature side to the low-temperature side is greatly reduced. Since the vacuum interspace is very minute, the barrier against electrons, which emerges due to a space-charge effect, is small. Therefore, the emission of electrons is efficiently conducted. In the case where the high-efficiency electron emission cathodes described in Example 1 or 2 is used, a remarkable cooling effect is obtained due to the electron evaporation effect. As a result, a light-weight, high-efficiency and high-power thermoelectric cooling device can be realized.

Although Examples 3 and 4 described flat displays and thermoelectric cooling devices as application examples of the electron emission devices described in Examples 1 and 2, the electron emission cathode and electron emission device of the present invention are also applicable to a switching device which operates at a high speed.

Thus, according to the present invention, there are provided an electron emission cathode and an electron emission device which are relatively immune to deterioration over time, allow configuration as large area devices, and are capable of emitting electrons at a high efficiency even in a low degree of vacuum, with low cost and excellent mass-productivity. Moreover, a high-luminescence, long-life, and large-display flat display incorporating the electron emission electrode is provided.

Furthermore, a light-weight, high-efficiency and high-power thermoelectric cooling device incorporating the electron emission electrode is provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An electron emission cathode comprising: an n-type semiconductor film including diamond particles partially projecting from a surface of the n-type semiconductor film,
wherein electrons are emitted by applying a voltage between an anode and the n-type semiconductor film.

2. An electron emission cathode according to claim 1, wherein the diamond particles are composed of a p-type semiconductor.

3. An electron emission cathode comprising: a carbon film including diamond particles partially projecting from a surface of the carbon film,
wherein electrons are emitted by applying a voltage between an anode and the carbon film.

4. An electron emission cathode according to claim 3, wherein the carbon film is an n-type semiconductor or a pseudo n-type semiconductor.

5. An electron emission cathode according to claim 3, wherein the carbon film includes nitrogen as an n-type impurity, and a portion of the carbon film includes particles having a diamond structure.

6. An electron emission cathode according to claim 3, wherein said carbon film is on an outer surface of the electron emission cathode.

7. An electron emission cathode according to claim 3, wherein said carbon particles are partially embedded in the carbon film.

8. An electron emission cathode comprising:
a conductive film,
a first semiconductor film of a first conductivity type formed on the conductive film; and
an island-like second semiconductor film of a second conductivity type formed on the first semiconductor film,
wherein electrons are emitted by applying a voltage between an anode and the second semiconductor film.

9. An electron emission cathode according to claim 8, wherein the first semiconductor film is formed in an island-like shape.

10. An electron emission cathode according to claim 8, wherein one of the first semiconductor film and the second semiconductor film includes diamond doped with boron.

11. An electron emission cathode according to claim 8, wherein one of the first semiconductor film and the second semiconductor film is composed of a thin carbon film containing nitrogen, the thin carbon film being produced by using one selected from the group consisting of pyridine, pyridazine, pyrimidine and 1,3,5-triazine.

12. An electron emission cathode comprising:
a conductive film;
a first semiconductor film of a first conductivity type formed on the conductive film; and
a second semiconductor film of a second conductivity type formed on the first semiconductor film and having a plurality of openings provided therein, the plurality of openings at least exposing a surface of the first semiconductor film,
wherein electrons are emitted by applying a voltage between an anode and the second semiconductor film.

13. An electron emission cathode according to claim 12, wherein the plurality of openings are also present in the first semiconductor film, thereby exposing a surface of the conductive film.

14. An electron emission cathode according to claim 12, wherein one of the first semiconductor film and the second semiconductor film includes diamond doped with boron.

15. An electron emission cathode according to claim 12, wherein one of the first semiconductor film and the second semiconductor film is composed of a thin carbon film containing nitrogen, the thin carbon film being produced by using one selected from the group consisting of pyridine, pyridazine, pyrimidine and 1,3,5-triazine.

16. An electron emission device comprising: a cathode composed essentially of an n-type semiconductor film including diamond particles partially projecting from a surface of the n-type semiconductor film; and an anode opposing the n-type semiconductor film with a vacuum interposed therebetween,
wherein electrons are emitted from the cathode by applying a voltage between the anode and the cathode.

17. An electron emission device according to claim 16 further comprising a gate electrode provided between the cathode and the anode, the gate electrode having an opening for exposing at least a portion of the cathode, wherein electrons are drawn out from the cathode by a voltage applied to the gate electrode.

18. An electron emission device according to claim 17, wherein the cathode and the gate electrode are formed in stripes extending along different directions so as to intersect each other, and the opening is provided in the opening in an intersection of the cathode and the gate electrode.

19. An electron emission device comprising: a cathode composed essentially of a carbon film including diamond particles partially projecting from a surface of the carbon film; and an anode opposing the carbon film with a vacuum interposed therebetween,
wherein electrons are emitted from the cathode by applying a voltage between the anode and the cathode.

20. An electron emission device according to claim 19 further comprising a gate electrode provided between the cathode and the anode, the gate electrode having an opening for exposing at least a portion of the cathode, wherein electrons are drawn out from the cathode by a voltage applied to the gate electrode.

21. An electron emission device according to claim 20, wherein the cathode and the gate electrode are formed in stripes extending along different directions so as to intersect each other, and the opening is provided in the opening in an intersection of the cathode and the gate electrode.

22. An electron emission device comprising:
a cathode including a conductive film, a first semiconductor film of a first conductivity type formed on the conductive film, and an island-like second semiconductor film of a second conductivity type formed on the first semiconductor film; and
an anode opposing the first semiconductor film with a vacuum interposed therebetween,
wherein electrons are emitted from the cathode by applying a voltage between the anode and the cathode.

23. An electron emission device according to claim 22 further comprising a gate electrode provided between the cathode and the anode, the gate electrode having an opening for exposing at least a portion of the cathode, wherein electrons are drawn out from the cathode by a voltage applied to the gate electrode.

24. An electron emission device according to claim 23, wherein the cathode and the gate electrode are formed in stripes extending along different directions so as to intersect each other, and the opening is provided in the opening in an intersection of the cathode and the gate electrode.

25. An electron emission device comprising:
a cathode including a conductive film, a first semiconductor film of a first conductivity type formed on the conductive film; and a second semiconductor film of a second conductivity type formed on the first semiconductor film and having a plurality of openings provided therein, the plurality of openings at least exposing a surface of the first semiconductor film; and
an anode opposing the first semiconductor film with a vacuum interposed therebetween,
wherein electrons are emitted from the cathode by applying a voltage between the anode and the cathode.

26. An electron emission device according to claim 25 further comprising a gate electrode provided between the cathode and the anode, the gate electrode having an opening for exposing at least a portion of the cathode, wherein electrons are drawn out from the cathode by a voltage applied to the gate electrode.

27. An electron emission device according to claim 26, wherein the cathode and the gate electrode are formed in stripes extending along different directions so as to intersect each other, and the opening is provided in the opening in an intersection of the cathode and the gate electrode.

28. A flat display comprising:
a support substrate;
a cathode provided on the support substrate, the cathode being composed essentially of an n-type semiconductor film including diamond particles partially projecting from a surface of the n-type semiconductor film;
a transparent substrate; and
a fluorescent substance provided on a surface of the transparent electrode,
wherein the support substrate and the transparent substrate are disposed in such a manner that the cathode and the fluorescent substance oppose each other, and a vacuum in an interspace between the support substrate and the transparent.

29. A flat display according to claim 28 further comprising a gate electrode provided between the cathode and the fluorescent substance, the gate electrode having an opening for exposing at least a portion of the cathode, wherein electrons are drawn out from the cathode by a voltage applied to the gate electrode.

30. A flat display according to claim 29, wherein the cathode and the gate electrode are formed in stripes extending along different directions so as to intersect each other, and the opening is provided in an intersection of the cathode and the gate electrode.

31. A flat display comprising:

a support substrate;

a cathode provided on the support substrate, the cathode being composed essentially of a carbon film including diamond particles partially projecting from a surface of the carbon film;

a transparent substrate; and a fluorescent substance provided on a surface of the transparent electrode, wherein the support substrate and the transparent substrate are disposed in such a manner that the cathode and the fluorescent substance oppose each other, and a vacuum in an interspace between the support substrate and the transparent.

32. A flat display according to claim 31 further comprising a gate electrode provided between the cathode and the fluorescent substance, the gate electrode having an opening for exposing at least a portion of the cathode, wherein electrons are drawn out from the cathode by a voltage applied to the gate electrode.

33. A flat display according to claim 32, wherein the cathode and the gate electrode are formed in stripes extending along different directions so as to intersect each other, and the opening is provided in an intersection of the cathode and the gate electrode.

34. A flat display comprising:

a support substrate;

a cathode provided on the support substrate, the cathode including a conductive film, a first semiconductor film of a first conductivity type formed on the conductive film, and an island-like second semiconductor film of a second conductivity type formed on the first semiconductor film;

a transparent substrate; and a fluorescent substance provided on a surface of the transparent electrode, wherein the support substrate and the transparent substrate are disposed in such a manner that the cathode and the fluorescent substance oppose each other, and a vacuum in an interspace between the support substrate and the transparent.

35. A flat display according to claim 34 further comprising a gate electrode provided between the cathode and the fluorescent substance, the gate electrode having an opening for exposing at least a portion of the cathode, wherein electrons are drawn out from the cathode by a voltage applied to the gate electrode.

36. A flat display according to claim 35, wherein the cathode and the gate electrode are formed in stripes extending along different directions so as to intersect each other, and the opening is provided in an intersection of the cathode and the gate electrode.

37. A flat display comprising:

a support substrate;

a cathode including a conductive film, a first semiconductor film of a first conductivity type formed on the conductive film; and a second semiconductor film of a second conductivity type formed on the first semiconductor film and having a plurality of openings provided therein, the plurality of openings at least exposing a surface of the first semiconductor film;

a transparent substrate; and a fluorescent substance provided on a surface of the transparent electrode, wherein the support substrate and the transparent substrate are disposed in such a manner that the cathode and the fluorescent substance oppose each other, and a vacuum in an interspace between the support substrate and the transparent.

38. A flat display according to claim 37 further comprising a gate electrode provided between the cathode and the fluorescent substance, the gate electrode having an opening for exposing at least a portion of the cathode, wherein electrons are drawn out from the cathode by a voltage applied to the gate electrode.

39. A flat display according to claim 38, wherein the cathode and the gate electrode are formed in stripes extending along different directions so as to intersect each other, and the opening is provided in an intersection of the cathode and the gate electrode.

* * * * *